United States Patent
Hauptmann et al.

(10) Patent No.: US 6,499,908 B2
(45) Date of Patent: Dec. 31, 2002

(54) LOCKING SYSTEM

(75) Inventors: Udo Hauptmann, Landsberg/Lech (DE); Heinz Grünewald, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/903,897

(22) Filed: Jul. 12, 2001

(65) Prior Publication Data
US 2002/0006310 A1 Jan. 17, 2002

(30) Foreign Application Priority Data
Jul. 15, 2000 (DE) ......................... 100 34 438

(51) Int. Cl.[7] ................................. F16B 21/00
(52) U.S. Cl. ................... 403/322.2; 403/322.1; 403/321; 285/305; 279/78
(58) Field of Search .................. 285/305, 321; 403/321, 322.1, 322.2, 322.3, 325; 279/76, 22, 30, 905; 81/438

(56) References Cited

U.S. PATENT DOCUMENTS

| | | | | |
|---|---|---|---|---|
| 1,054,126 A | * | 2/1913 | Lindberg .................. 403/322.2 |
| 1,814,655 A | * | 7/1931 | Andreasson .................. 279/76 |
| 2,348,611 A | * | 5/1944 | Davidson ..................... 188/67 |
| 4,192,225 A | * | 3/1980 | Moyer ......................... 285/321 |
| 4,404,714 A | * | 9/1983 | Duran ......................... 24/652 |
| 4,570,980 A | * | 2/1986 | Goward ...................... 285/305 |
| 4,603,998 A | * | 8/1986 | Bober et al. ................. 403/316 |
| 4,645,372 A | * | 2/1987 | Suzuki ........................ 403/316 |
| 4,749,301 A | * | 6/1988 | Suzuki ..................... 403/322.2 |
| 4,775,269 A | * | 10/1988 | Brix ............................ 279/78 |
| 4,957,387 A | * | 9/1990 | Nasu .......................... 403/317 |
| 5,335,947 A | * | 8/1994 | Remsburg .................... 285/267 |
| 5,979,946 A | * | 11/1999 | Petersen et al. .......... 285/143.1 |
| 6,152,645 A | * | 11/2000 | Sanford .................... 403/322.2 |
| 6,343,808 B1 | * | 2/2002 | Luh ........................... 280/511 |
| 6,352,288 B1 | * | 3/2002 | Calkins ....................... 285/305 |

* cited by examiner

Primary Examiner—Lynne H. Browne
Assistant Examiner—James M. Hewitt
(74) Attorney, Agent, or Firm—Sidley Austin Brown & Wood, LLP

(57) ABSTRACT

A locking system with at least one locking element has a sleeve (2) with an inner groove (3) and an outer groove (4), which lie in a common plane and encircle at least one half of the circumference, the outer groove (4) accommodating a radially pre-stressed spring washer (9) forming an open sector in the circumferential direction between the legs (12) on either side, which are pointedly bent towards the inside and extend through assigned radial openings (5) of the sleeve (2) into the inner groove (3).

4 Claims, 2 Drawing Sheets

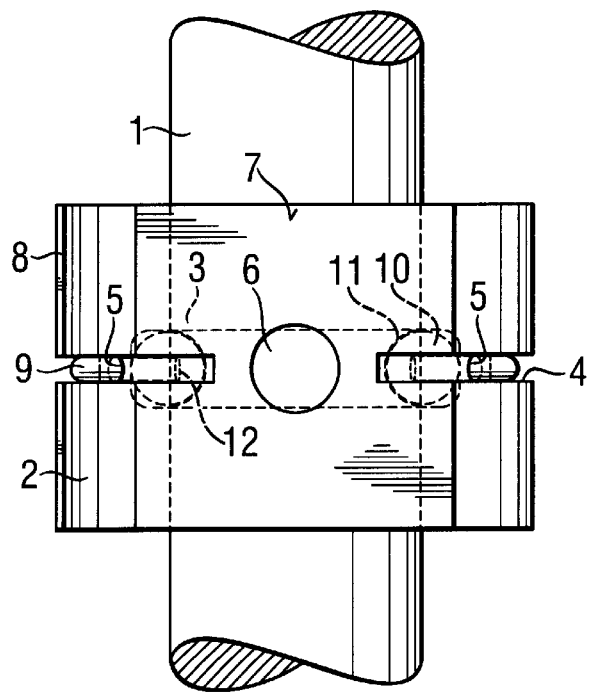
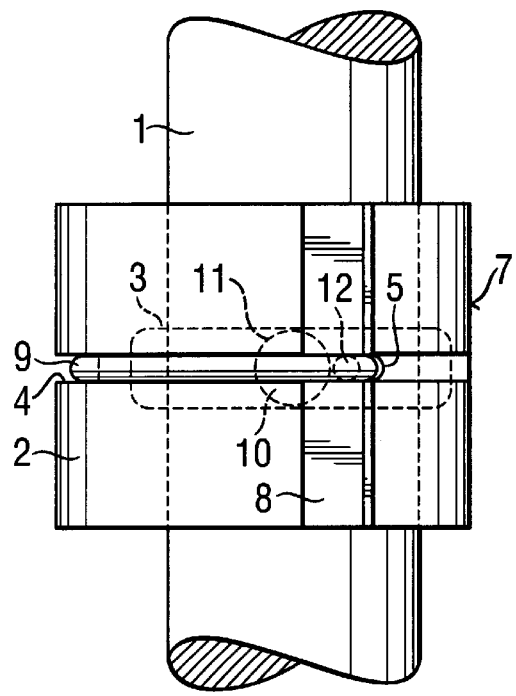
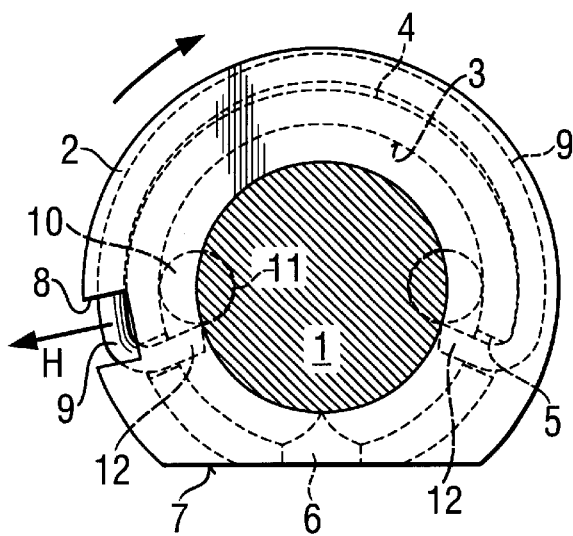

LOCKING SYSTEM

BACKGROUND OF THE INVENTION

The invention is directed to a locking system with components, such as transporting helixes of drilling tools, which rotate and/or strike partially, springs, gearwheels, clutches and couplings, switch levers and the like which can easily be mounted and dismounted and fixed axially on cylindrical shafts.

According to U.S. Pat. No. 4,645,372, a locking system for rapidly mounting and dismounting positive connections on cylindrical shafts consists of the shaft, having an encircling, radial groove, and an external, coaxially disposed sleeve with a radial opening, which contains a locking element in the form of a ball, and, in the locking state, is forced into an axially positive engagement in the groove of the shaft by a locking sleeve, under the tension of a spring, and can be shifted axially.

In U.S. Pat. No. 5,335,947, such a locking system is disclosed, with a locking element in the form of a ball and a locking sleeve, under the tension of a spring, can be shifted axially, and is used for the axially fixed connection of pipes.

Further in DE 19727187 A1, a screw bit is connected over a locking system with the tool shaft of an electrical hand operated tool driving device, and a locking element in the form of a ball engages an inner recess of a sleeve.

In U.S. Pat. No. 4,957,387, a locking element in the form of a ball, in addition to an axially displaceable locking sleeve, providing a positive connection by force, is forced directly into the groove by a peripheral, radially pre-tensioned spring, which temporarily fixes the shaft axially.

SUMMARY OF THE INVENTION

It is a primary object of the invention to provide a locking system for a cylindrical shaft, which, dynamically, can be stressed strongly in the axial direction and can be easily mounted and dismounted.

Essentially, the locking system comprises at least one locking element, advantageously in the form of a ball, a shaft with an axially limited, radial recess, for receiving the locking element, and a sleeve. Moreover, the sleeve has a coaxial central opening for the sleeve, and a radially extending insertion opening for the locking element, and an inner and an outer groove located in a common plane extending perpendicular to the sleeve axis and circling at least around half of the circumference. The outer groove supports a radially pre-tensioned spring washer, which has spaced radially inwardly directed legs forming an open sector. The legs are bent radially inwardly towards the inside on either end and extend through radially extending openings of the sleeve into the inner groove.

Advantageously, for reasons of symmetry, two balls are used as locking elements, which advantageously engage two radially facing spherically shaped recesses in the shaft, located diametrically opposite one another.

Furthermore, an external and elongated, axially extending groove is assigned to the openings and permits a pointed dismounting tool to be inserted behind the spring washer.

Advantageously, the outside of the sleeve has a flattened region laterally outwardly of the insertion opening, as a result of which a positive torque can be applied.

The spring washer is pre-installed in the outer groove encircling the sleeve. The two legs of the spring washer extend into the inner groove through the radially extending openings. During locking, the sleeve is pushed over a shaft, especially within a drilling tool, so that the insertion opening lies over a recess, disposed in the shaft of the drilling tool. A ball is inserted and, by rotating the sleeve is guided into the inner groove. By rotating the sleeve further, the ball forces one leg of the spring washer through the openings to the outside. After passing over the ball, the leg then catches behind this ball. While retaining the direction of rotation, the insertion opening is placed over the second recess in the shaft of the drilling tool and the second ball, like the first one, is inserted into the inner groove of the sleeve. Together with the recess of the shaft and the inner groove of the sleeve, the ball forms a positive axially fixed connection. The locking is thus possible without any additional device. For the unlocking, a stiff, pointed device, such as a screwdriver, is required, which engages along the axially extending groove behind the spring washer.

The advantages of the invention lie in the easy handling of locking and unlocking. The locking system can be put statically and dynamically under heavy axial loads and, to a lesser extent; also under high dial loads, which occur particularly drilling percussion drilling. The locking and unlocking can be repeated frequently. Special devices or tools are not required for this purpose.

The various features of novelty which characterize the invention are pointed out with particularity in the claims annexed to and forming a part of this disclosure. For a better understanding of the invention, its operating advantages and specific objects attained by it use, references should be had to the drawings and description matter in which there are illustrated and described preferred embodiments of the invention.

BRIEF DESCRIPTION OF THE DRAWING

The invention is described in greater detail in connection with an advantageous example, as set forth in:

FIG. 3A an elevational view, similar to FIG. 2;

FIG. 3B an elevational view, turned 90° relative to FIG. 3A; and

FIG. 3C a transverse sectional of the locking system in FIG. 3A.

DETAILED DESCRIPTION OF THE INVENTION

Figure 1:
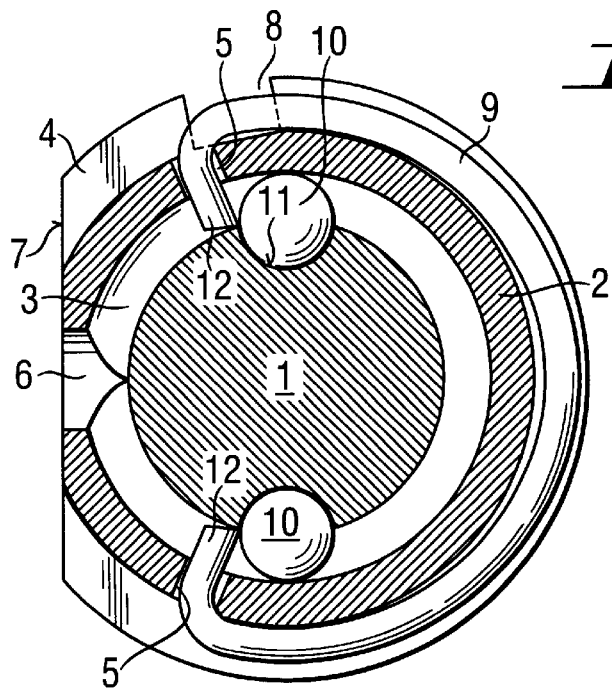
FIG. 1 a sectional view of the inventive locking system.

In FIG. 1, a locking system comprises a cylindrical shaft 1, an outer sleeve 2 coaxial with the shaft 1 and having an encircling inner groove 3 and outer groove 4 located in a plane extending perpendicularly to the axis of the sleeve 2, two openings 5, extending radially between the inner and outer grooves, as well as a radially extending insertion opening 6 at a flat surface 7 of the sleeve 2, an axially extending groove 8, for traversing one of the openings 5, a spring washer 9, disposed in the outer groove 4, and of two balls 10 forming the fastening elements. At the cylindrical shaft 1, there are diametrically opposite partly spherically shaped recesses 11. The spring washer 9 is pre-installed in the outer groove 4 on the sleeve 2, with each of its legs 12 protruding through a different one of the openings 5 into the inner groove 3.

Figure 2:
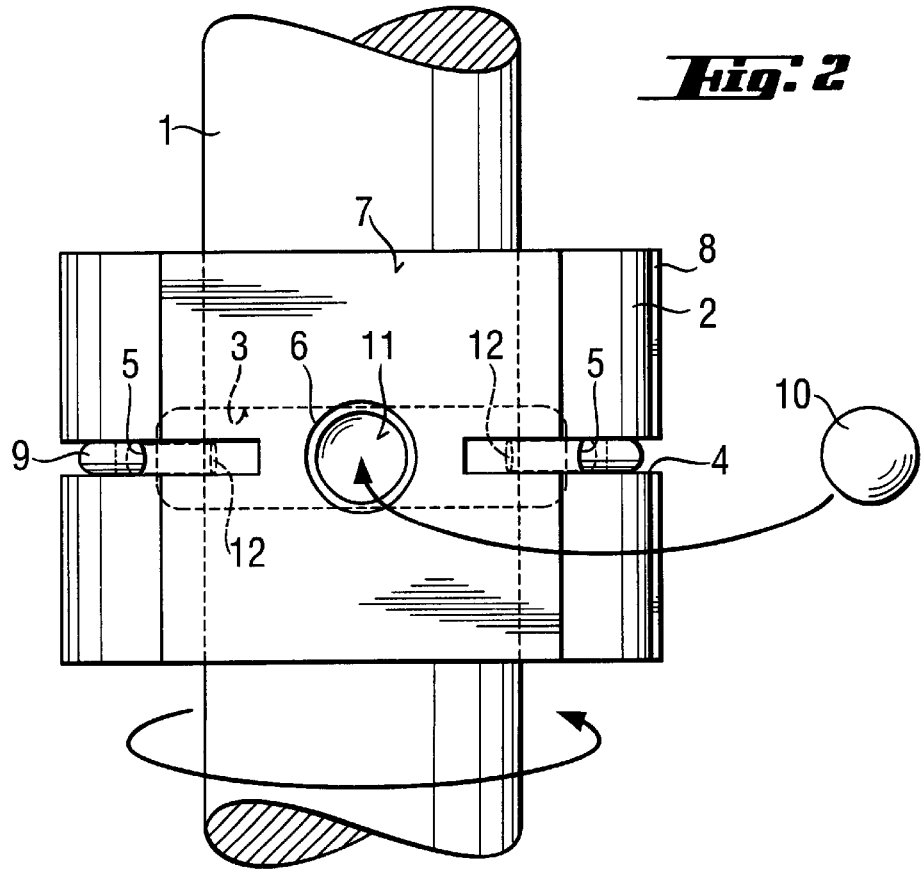
FIG. 2 an axially extending elevational view of the locking system.

According to FIG. 2, the sleeve 2 is pushed axially over the shaft 1 during the locking process and the insertion opening 6 is positioned over one of the recesses 11. A ball 10 is inserted and, by rotating the sleeve 2, transferred to the inner groove 3. Rotating the sleeve 2 further causes the ball 10 to force one leg 12 of the spring washer 9 to the outside. This leg 12 then engages once again behind the ball 10. While maintaining the direction of rotation, the insertion opening 6 is positioned over the second recess 11 and the process is repeated with the second ball 10. The balls 10 are prevented from jumping over at the inner sides of the leg by the length of the leg, extending over the radius of the balls, and by a sharp bending.

According to FIGS. 3A–C, the sleeve 2 is locked, in that the balls 10 are fixed radially and positively between the two legs 12 of the spring washer 9 and the sleeve 2 is fixed positively and axially by the inner groove 3 over the balls 10 with the recesses 11 of the shaft 1. It can be put under stress axially and, to a lesser extent, radially. For unlocking, the spring washer 9 is easily levered radially by means of a stiff pointed device H in the groove 8, as a result of which the leg 12 is forced over the center of the ball. By simultaneously rotating the sleeve 2, the ball 10 is transferred to the insertion opening 6 and removed. By continuing to rotate the sleeve 2, the second ball 10 is removed in the same manner and the sleeve 2 is thus unlocked.

What is claimed as new and desired to be protected by Letters Patent is set forth in the appended claims.

What is claimed is:

1. A locking system, comprising an axially extending shaft (1), and having at least one radially inwardly directed recess in an outside surface of said shaft, at least one locking element received in said at least one inwardly directed recess, an axially extending sleeve (2) coaxial with and encircling said shaft (1) and having a radially extending insertion opening (6) in said sleeve (2) arranged to receive said locking element, said sleeve (2) has a radially inner surface and a radially outer surface with an inner circumferentially extending groove (3) in said radially inner surface and an outer circumferentially extending groove (4) in said outer surface both arranged in a common plane perpendicular to the axis of said sleeve and encircling at least half of the circumference of said sleeve, a radially prestressed spring washer (9) positioned in said outer groove, said spring washer (9) having opposite ends (12) spaced apart in the circumferential direction and forming an open sector therebetween, each of said opposite ends bent radially inwardly and extending through radially extending openings (5) in said sleeve (2) from said outer groove (4) into said inner groove (3).

2. A locking system, as set forth in claim 1, wherein said shaft has two inwardly directed recesses in the outside surface thereof arranged diametrically opposite one another, and said locking system comprising two locking elements in the form of balls received in said two recesses.

3. A locking system, as set forth in claim 1, wherein an axially extending groove (8) is formed in said outer surface of said sleeve (2) arranged to traverse one of said openings (5).

4. A locking system, as set forth in claim 1, wherein said outer surface of said sleeve has an axially extending flat surface (7).

* * * * *